United States Patent [19]

Wu

[11] Patent Number: 5,473,797
[45] Date of Patent: Dec. 12, 1995

[54] SAFETY DEVICE FOR FIXING CORDS OF VENETIAN BLIND

[76] Inventor: Te-Tsun Wu, No. 32-1, Hsin Sheng Rd., Fu Pao Tsun, Fun Hsing Hsiang, Changhua Hsien, Taiwan

[21] Appl. No.: 343,991

[22] Filed: Nov. 18, 1994

[51] Int. Cl.⁶ ..................................................... F16G 11/00
[52] U.S. Cl. .................... 24/115 H; 24/115 R; 24/115 K; 160/178.2
[58] Field of Search ............................ 24/115 H, 115 K, 24/115 R, 115 N, 115 F, 132 WL, 712, 712.1, 712.3; 160/178.2; 403/208, 209, 210

[56] References Cited

U.S. PATENT DOCUMENTS

| | | | |
|---|---|---|---|
| 297,241 | 4/1884 | Egge | 24/115 R |
| 866,144 | 9/1907 | Kobert | 24/115 R |
| 2,740,654 | 4/1956 | Orschel | 24/115 R |
| 5,167,268 | 12/1992 | Mao | 160/178.2 |
| 5,208,950 | 5/1993 | Merritt | 24/115 H |

*Primary Examiner*—Victor N. Sakran
*Attorney, Agent, or Firm*—Browdy and Neimark

[57] ABSTRACT

The present disclosure relates to a safety device for retaining the cords of a Venetian blind, comprising two integrally molded upper and lower covers in the shape of trapezoid having a long protruding edge at the longer side of each of the trapezoid-shaped covers and a protruding edge at the top side of each thereof. Inside the upper part of both the upper and lower covers are disposed a long protruding post and a splitted column hollowed inside, whereas the lower part of them are an inverted U-shaped square column attached at its bottom to an elastic stop plate amputated at its bottom with serrated teeth and a pressing block slanting sidewardly. In operation, the cords (either two, three, or four) can be passed through the cord hole of the protruding edge and fixed by the serrated teeth of the elastic stop plate of the inverted U-shaped square member in a space between the elastic stop plate and the fending edge in the assembling of the two upper and lower covers when the long protruding posts are inserted to the hollow space of the splitted columns and the sidewardly slanting pressing blocks are pressed onto the elastic stop plates forcing the elastic stop plates to abut against the fending edges. The safety device is easy to assemble and convenient for the adjustment of the cords into equal length. Besides, it can prevent a child from strangling when the child's neck gets caught between the cords.

1 Claim, 3 Drawing Sheets 5,473,797

SAFETY DEVICE FOR FIXING CORDS OF VENETIAN BLIND

BACKGROUND OF THE INVENTION

The present invention relates to a safety device for keeping the cords of Venetian blinds, especially to a safety device comprising two integrally molded upper and lower covers in the shape of trapezoid, having a fending edge at the longer side of each of the trapezoid-shaped covers and a protruding edge opened with a U-shaped cord hole at the top side of each one. Inside the upper part of both the upper and lower covers are disposed a long protruding post and a splitted column hollowed inside, and the lower part of them are an inverted U-shaped square member attached at its bottom to an elastic stop plate amputated at its bottom with serrated teeth, and a pressing block slanting sidewardly. The safety device can be assembled easily to keep the cords of a Venetian blind and disassembled safely to avoid the accident of strangling when a child accidently get caught between the cords.

A conventional device for keeping the cords of a Venetian blind is an integrally molded cord set hollowed inside with a cord hole at its top for cords to pass therethrough. Passing through the cord hole, cords of the Venetian blind—either two, three, or four—are then knotted either respectively or all together at their ends to complete the assembling of the cord set and the cords. Yet, before the knotting, the cords must be adjusted into the same lenghth, otherwise, if any irregularity, the cords must be unknotted and knotted again. Furthermore, a conventional cord set can easily cause the danger of strangling when a child's neck accidentally get caught between the enclosed space formed between the cords and the cord set.

SUMMARY OF THE INVENTION

It is, therefore, the primary object of the present invention to provide a safety device for keeping the cords of a Venetian blind comprising two integrally molded upper and lower covers, thereof, through the assembling of these two covers, the cords can be slided through and fixed between the space between the fending edge and the elastic stop plate of the inverted U-shaped square member when the pressing block approaches and presses onto the elastic stop plate of the inverted U-shaped square member. And through the safety device, the cords are easily adjusted into the equal lenghth without the inconvenience of knotting and unknotting of a conventional cord set.

Another object of the present invention is to provide a safety device, characterized in that when a child's neck get caught between the cords, the assembled upper and lower covers will be dismantled safely at the pressure of the wide open cords. The long protruding post will separate from the splitted column and the elastic stop plate of the inverted U-shaped square member will be released at the absence of the pressing block. Thus an accident of strangling can be avoided.

DETAILED DESCRIPTION OF THE PREFERRED EMBODIMENTS

Figure 1:
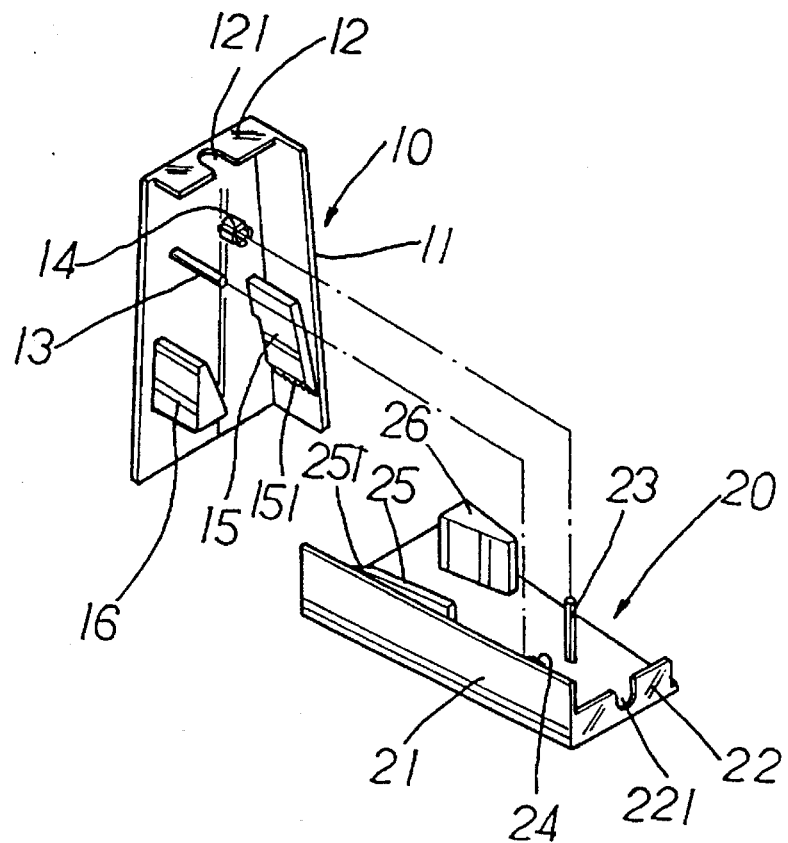
FIG. 1 is a perspective diagram showing the exploded components of the present invention.

Please referring to FIG. 1, the present invention is an improved safety device for keeping the cords of a Venetian blind, comprising two integrally molded upper and lower covers 10, 20 in the shape of trapezoid, having a fending edge 11, 21 at the longer sides of each of the trapezoid-shaped covers and a protruding edge 12, 22 opened with a U-shaped cord hole 121, 221 at the top side of each thereof. Inside the upper part of both the upper and lower covers 10, 20 are disposed a long protruding post 13, 23 and a splitted column hollowed inside 14, 24; whereas the lower part of them are an inverted U-shaped square member 15, 25 and a pressing block 16, 26 slanting sidewardly at one side. Attached to the inverted U-shaped square member 15, 25 at its bottom side is an elastic stop plate 151, 251 amputated at its bottom with serrated teeth.

Figure 2:
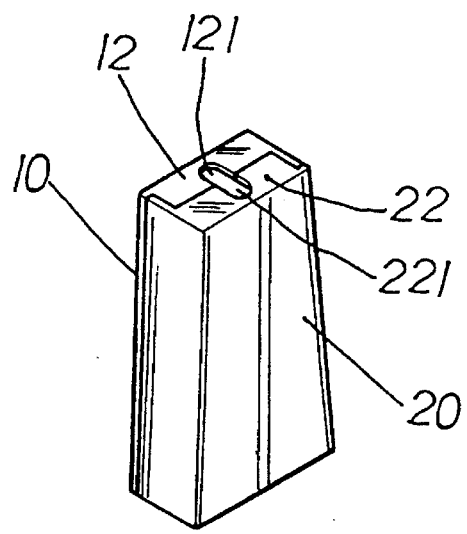
FIG. 2 is a perspective diagram showing the assembled present invention.

Referring to FIG. 2, in assembling, both the upper and lower covers are closed up, and the long protruding post 13 of the upper cover 10 is inserted into the hollow space of the splitted column 24 of the lower cover 20, and the same of the long protruding post 23 of the lower cover 20 to the splitted column 14 of the upper cover 10; whereas the sidewardly slanting pressing block 16 of the upper cover 10 presses the elastic stop plate 251 of the inverted U-shaped square member 25 at the lower cover 20, forcing the elastic stop plate 251 to abut against the fending edge 21; identically the pressing block 26 of the lower cover 20 pressing the elastic stop plate 151 of the inverted U-shaped square member 15, resulting in the abutment of the elastic stop plate 151 towards the fending edge 11.

Figure 3:
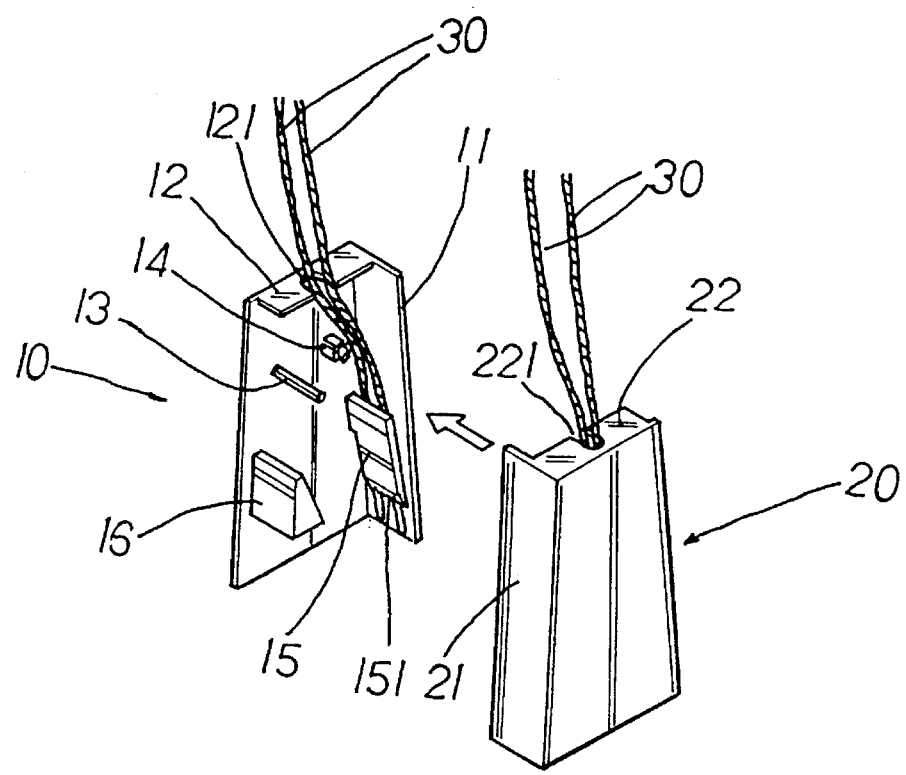
FIG. 3 is an operational view showing the cords applying onto the upper and lower covers of the present invention.

Please referring to FIG. 3, in practical operation, the cords 30 of Venetian blind is fixed between the upper and lower covers 10, 20. The cords 30 are put through the cord hole 121 of the protruding hem 12 and fixed by the serrated teeth at the bottom of the elastic stop plate 151 of the inverted U-shaped square member 15 into the space between the elastic stop plate 151 and the fending edge 11; and the other cords 30 are put in the same way to that of the lower cover 20; while the cords are adjusted into the same lenghth in the upper and lower covers 10, 20, both covers can be closed up to complete the action of practical operation.

Figure 4:
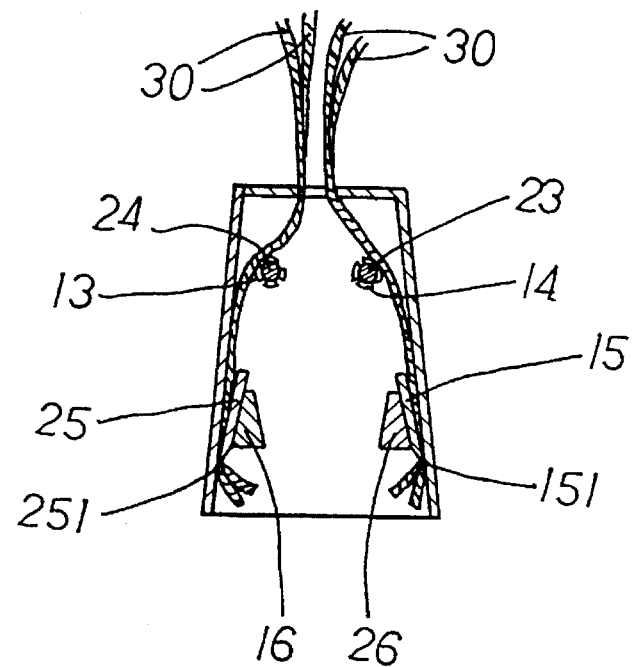
FIG. 4 is a cross-sectional view showing the assemble of the present invention in a practical operation.

Please referring to FIG. 4, in a sectional view, the long protruding post 13 Of the upper cover 10 is inserted into the hollow space of the splitted column 24 of the lower cover 20 and the long protruding post 23 of the lower cover 20 to that of the splitted column 14 of the upper cover 10; whereas the sidewardly slanting pressing block 16 of the upper cover 10 presses the elastic stop plate 251 of the inverted U-shaped square member 25 at the lower cover 20, forcing the elastic stop plate 251 to come into abutment against the fending edge 21 and the serrated teeth of the elastic stop plate 251 to fix the cords 30 of a Venetian blind; and identically is the pressing block 26 of the lower cover 20 related to that of the upper cover 10, etc. . . .

Figure 5:
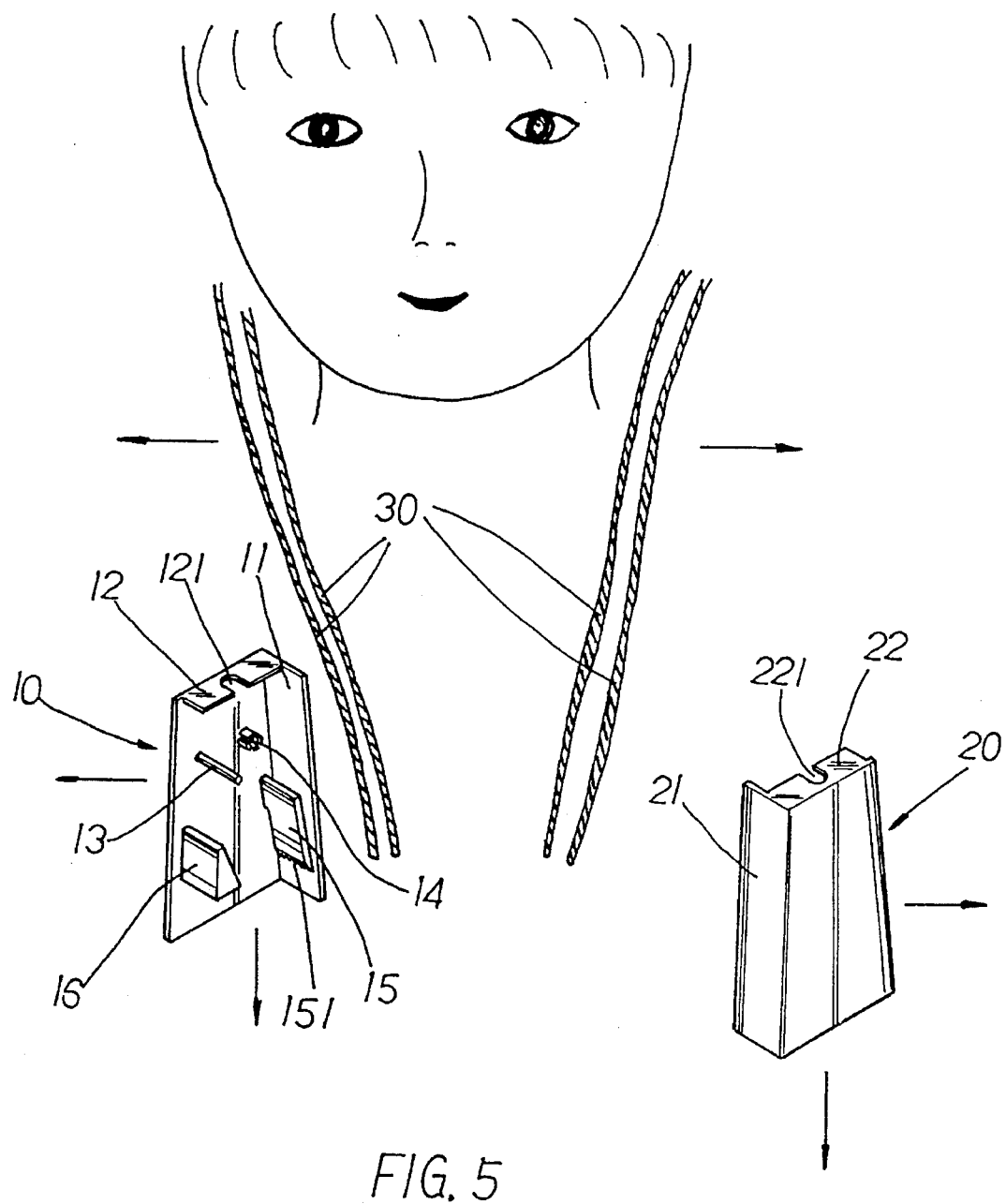
FIG. 5 is an operational view showing the dismantling of the present invention when the cords are accidently pulled wide open.

Please referring to FIG. 5, in case of accident when a child's neck get caught between the cords 30, the wide open cords 30 will force the assembled upper and lower covers 10, 20 to dismantle. The long protruding post 13 of the upper cover 10 will unhinge and separate from the hollow space of the splitted column 24 of the lower cover 20, and the long protruding post 23 of the lower cover 20 from that of the splitted column 14 of the upper cover 10; whereas the absence of the pressing block 16, 26 releases the elastic stop plate 251, 151 and let loose the fixed cords 30 from the serrated teeth of the elastic stop plate 251, 151.

What is claimed is:

1. A safety device for keeping the cords of a Venetain blind, comprising two integrally molded upper and lower covers in the shape of a trapezoid, a fending edge disposed at the longer side of each of the trapezoid-shaped covers and a protruding edge opened with a U-shaped cord hole at the top side of each thereof, inside the upper part of both the upper and lower covers being disposed a long protruding post and a splitted column hollowed inside; and the lower part of both being an inverted U-shaped square member attached at its bottom to an elastic stop plate amputated at its bottom with serrated teeth and a sidewardly slanting pressing block;

in assembling of these two upper and lower covers while the long protruding post being inserted to the hollow space of the splitted column and the pressing block being pressed onto the elastic stop plate of the inverted U-shaped square member, the cords, passing through the cord hole of the protruding edge, can be fixed by said serrated teeth of said elastic stop plate in a space between the elastic stop plate and the fending edge; whereby the cords can be adjusted easily through the device to avoid the accident of strangling.

* * * * *